United States Patent
Becker et al.

(10) Patent No.: US 12,442,234 B2
(45) Date of Patent: Oct. 14, 2025

(54) AIRCRAFT DOOR WITH AN ADJUSTMENT SYSTEM FOR ADJUSTING THE POSITION OF THE DOOR LEAF RELATIVE TO THE DOOR FRAME

(71) Applicant: AIRBUS HELICOPTERS DEUTSCHLAND GMBH, Donauworth (DE)

(72) Inventors: Stefan Becker, Donauworth (DE); Thomas Tendyra, Schwenningen (DE); Christoph Merkel, Sontheim an der Brenz (DE); Christian Ferber, Roegling (DE)

(73) Assignee: AIRBUS HELICOPTERS DEUTSCHLAND GMBH, Donauwörth (DE)

(*) Notice: Subject to any disclaimer, the term of this patent is extended or adjusted under 35 U.S.C. 154(b) by 29 days.

(21) Appl. No.: 18/368,382

(22) Filed: Sep. 14, 2023

(65) Prior Publication Data

US 2024/0200378 A1  Jun. 20, 2024

(30) Foreign Application Priority Data

Dec. 19, 2022 (EP) .................... 22214699

(51) Int. Cl.
*E05D 15/00* (2006.01)
*B64C 1/14* (2006.01)

(52) U.S. Cl.
CPC ............ *E05D 15/00* (2013.01); *B64C 1/1461* (2013.01)

(58) Field of Classification Search
CPC ..... B64C 1/1461; B64C 1/1423; B64C 1/143; B64C 1/1438; B64C 1/1469; E05D 2007/0484; E05D 7/0045
See application file for complete search history.

(56) References Cited

U.S. PATENT DOCUMENTS

2022/0348304 A1  11/2022  Capron et al.

FOREIGN PATENT DOCUMENTS

| EP | 3983288 A1 | 4/2022 | |
| FR | 3100795 A1 * | 3/2021 | ........... B64C 1/1407 |
| FR | 3119158 A1 | 7/2022 | |
| WO | 2020253987 A1 | 12/2020 | |

OTHER PUBLICATIONS

European Search Report for European Application No. EP 22214699.5, Completed by the European Patent Office, Dated May 11, 2023, 5 pages.

* cited by examiner

*Primary Examiner* — Nicholas McFall
*Assistant Examiner* — Eric Acosta
(74) *Attorney, Agent, or Firm* — BROOKS KUSHMAN P.C.

(57) ABSTRACT

An aircraft door including a door leaf, a door frame, a support arm assembly, and first and second connecting elements. The first connecting element connects the support arm assembly with the door leaf and includes a first adjustment unit that is adapted for adjusting the position of the door leaf relative to the door frame along a first axis (x-axis). The second connecting element connects the support arm assembly with the door frame and includes a second adjustment unit that is adapted for adjusting the position of the door leaf relative to the door frame along a second axis (z-axis) that is perpendicular to the first axis (x-axis).

18 Claims, 8 Drawing Sheets

AIRCRAFT DOOR WITH AN ADJUSTMENT SYSTEM FOR ADJUSTING THE POSITION OF THE DOOR LEAF RELATIVE TO THE DOOR FRAME

CROSS-REFERENCE TO RELATED APPLICATIONS

This application claims priority to European patent application No. EP 22214699.5 filed Dec. 19, 2022, the disclosure of which is incorporated in its entirety by reference herein.

TECHNICAL FIELD

The present embodiments relate to an aircraft door, and, more particularly, to an aircraft door with an adjustment system for adjusting the position of the door leaf relative to the door frame. The present embodiments further relate to a method of operating such an aircraft door.

BACKGROUND

Doors and hatches are movable barriers that close an opening in a boundary between two environments and provide time-limited access between these two environments. Doors and hatches can be found in many technical applications. Examples for such applications include doors and hatches in aircraft, spacecraft, submarines, trains, vehicles, etc.

In the closed position, a door leaf of an aircraft door needs to be adjusted relative to its opening (i.e., the door frame) in the aircraft's fuselage. This adjustment is necessary to compensate for tolerances of the complex assembly of the door leaf and the door frame, to optimize the opening motion of the door leaf, and to optimize the position of the door leaf relative to the door frame in the closed position during flight due to aerodynamic reasons.

In general, an aircraft door consists of a door leaf, a door frame, and a support arm. Typically, the support arm is rotatably mounted to the door frame, and rotatably mounted to the door leaf. Often, the door leaf—support arm connection is mounted rotatably around two axes, the vertical aircraft axis and the longitudinal aircraft axis. To center the door leaf relative to the door frame in the closed position, the rotatably mounted support arm is adjustably arranged on the door leaf and the door frame.

Typically, a central element is held by the fork-shaped outer element. The fork-shaped outer element is rotatably mounted around the vertical aircraft axis to the support arm. The central element is surrounded by a fork-shaped inner element, which is part of the door leaf. The relative position between the fork-shaped inner element and the central element can be adjusted by filling the gaps between these elements with washers or by removing excess washers.

Document EP 3 983 288 A1 or WO2020253987 describes an aircraft door comprising a support arm connected to a support forearm by a first pivot connection about a first pivot axis, the support forearm being connected to the leaf by a second pivot connection about a second pivot axis parallel to the first pivot axis. The support arm is connected to the door frame by two hinges each comprising a pivot for rotating the support arm about a third pivot axis which is parallel to the first pivot axis and to the second pivot axis, this pivot being connected to the door frame by an attachment that is translatably adjustable in two directions orthogonal to one another and orthogonal to the third pivot axis. However, only the rotary section is tightened against the shoe by means of the lock nut and is thus supported without play. The connections between the shoe and the bolts, between the yoke and the sleeve and between the bolt and the yoke cannot be braced against each other and the play of the X-adjustment is therefore dependent solely on the manufacturing tolerances of these components to each other. The same applies to the lower X-Axis Adjustment device. As a result of this support arm adjustment, all axes respectively positioning directions are depending on the precision of the manufacturing tolerances between these parts. The documents FR3100795 and FR3119158 were cited.

Furthermore, during adjustment of the state-of-the-art aircraft doors, the fork-shaped inner element and the central element and thus the door leaf and the support arm need to be disconnected. During this operation, the door leaf needs to be lifted by a separate unit to ensure a force free connection between door leaf and support arm that enable the removal of a horizontal axle such that washers can be removed or added between the fork-shaped inner element and the central elements.

After reconnecting the fork-shaped inner element with the central element, the separate unit is removed and the position of the door leaf relative to the door frame has to be checked. If the position of the door leaf relative to the door frame is still unsatisfactory, the position can be adjusted in additional iterative staggered loops. This adjustment procedure is obviously time-consuming.

Furthermore, it was shown that the procedure of adding or removing washers causes damage to the central element and/or to the fork-shaped inner element. The damage often requires high effort exchange or repair of parts.

Moreover, the horizontal axle is usually designed as a bolt which is clamping the washers and the central element by sleeves. This means that the bolt and the central element have no axial fixation during the adjustment, which can result in unexpected wear between the central element and the horizontal axle.

SUMMARY

It is, therefore, an objective to provide a new aircraft door that overcomes the above limitations. In particular, it is an objective to provide a new aircraft door with an adjustment system that enables the adjustment of the position of the door leaf relative to the door frame without disconnecting the door leaf from the support arm. The new aircraft door should prevent any damage or unexpected wear during the adjustment process. Furthermore, it is an objective to simplify the adjustment procedure and reduce or eliminate the need of an iterative adjustment process.

This objective is solved by the opening system comprising the features of claim 1.

More specifically, an aircraft door for closing an opening in a fuselage of an aircraft in a closed position and for providing access to the aircraft through the opening in the fuselage in a fully open position, comprises a door frame with a door frame bracket, a door leaf with stiffening structures, a support arm assembly with first and second fork-shaped ends, and first and second connecting elements. The first connecting element connects the first fork-shaped end of the support arm assembly with the stiffening structures and comprises a first adjustment unit that is adapted for adjusting the position of the door leaf relative to the door frame along a first axis. The second connecting element connects the second fork-shaped end of the support arm assembly with the door frame bracket and comprises a second adjustment unit that is adapted for adjusting the position of the door leaf relative to the door frame along a second axis that is perpendicular to the first axis.

Advantageously, the adjustment of the door leaf in longitudinal direction (i.e., x-direction or between front and aft) of the aircraft and/or in vertical direction (i.e., z-direction or between bottom and top) of the aircraft can be performed decentralized at a location that is apart from the root of the support beam at the mounting on the door frame. Placing the adjustment units at a location apart from the root of the support beam at the mounting on the door frame has the advantage that the adjustment devices (screws, bolts, brackets etc. . . . ) for the adjustment units can be designed light-weight, because the adjustment units avoid carrying the whole weight of the door leaf. Furthermore, placing the first adjustment unit in the center of the door leaf has the advantage that the adjustment along the first axis (x-axis or longitudinal direction of the aircraft) is independent and does not affect the positioning of the door leaf relative to the door frame along the second axis (z-axis or vertical direction of the aircraft).

Moreover, placing the location of the adjustment sleeve for the adjustment along the second axis (z-axis or vertical direction of the aircraft) on the upper side of the support arm connection at the door frame makes the adjustment unit easy to reach for performing the adjustment. Moreover, the securing element and the adjustment unit are both located on the same side, thereby improving the accessibility of the adjustment unit for performing the adjustment process. This results in a simplified and less time-consuming adjustment process.

The fork-shaped ends of the support arm assembly help to reduce the forces and/or loads in the rotation bearings, resulting in lower frictional forces and therefore less wear and increased service life. An additional gliding element may ease the turning of the adjustment sleeve.

Compared to prior art solutions, the present technology reduces the adjustment effort as lifting of the door leaf during the adjustment, a disassemble-assemble procedure of the door leaf-support arm connection during adjustment, as well as adjustment iteration loops are avoided such that the result of the adjustment along the first and second axes with the adjustment units is immediately visible.

Furthermore, the present technology ensures damage free parts during the adjustment process, less loose parts, less wear, and no play during door operation, and a play-free adjustment. Moreover, the present technology improves the adjustment process by providing for a stepless adjustment and an improved accessibility of the adjustment unit.

According to one aspect, at least one of the first adjustment unit or the second adjustment unit is adapted for enabling a continuous adjustment of the position of the door leaf relative to the door frame.

In some implementations, the first connecting element further comprises a central element that extends parallel to the second axis between at least two prongs of the first fork-shaped end of the support arm assembly, wherein the central element is rotatably attached to the at least two prongs of the first fork-shaped end of the support arm assembly.

If desired, the first connecting element further comprises a fork-shaped inner element that is attached to the stiffening structures.

According to one aspect, the first adjustment unit further comprises an adjustment axle that extends parallel to the first axis through at least two prongs of the fork-shaped inner element, and a fixation element that rigidly attaches the adjustment axle to the central element.

Illustratively, the first adjustment unit further comprises at least one socket that is rotatably attached to the adjustment axle.

In some implementations, the fork-shaped inner element has inner threads and the first adjustment unit further comprises at least one adjustment element that is rigidly attached with the at least one socket, wherein the at least one adjustment element has an outer thread that is adapted for engaging with at least one of the inner threads of the fork-shaped inner element such that a rotation of the at least one adjustment element moves the fork-shaped inner element relative to the adjustment axle along the first axis, thereby adjusting the position of the door leaf relative to the door frame along the first axis.

According to one aspect, the first adjustment unit further comprises at least one securing element that is adapted for preventing a rotation of the at least one adjustment element.

If desired, the first adjustment unit is arranged in the center of the door leaf.

Illustratively, the second adjustment unit further comprises a central element that is attached to the door frame bracket.

In some implementations, the second adjustment unit further comprises an adjustment axle that extends parallel to the second axis through at least two prongs of the second fork-shaped end of the support arm assembly, and first and second clamping sleeves that attach the adjustment axle to the central element and prevent a movement of the adjustment axle relative to the central element along the second axis.

According to one aspect, at least one of the at least two prongs of the second fork-shaped end has an inner thread and the second adjustment unit further comprises an adjustment sleeve with an outer thread that is rotatably mounted to one of the first and second clamping sleeves to prevent a movement of the adjustment sleeve relative to the adjustment axle along the second axis, wherein the outer thread is adapted for engaging with the at least one of the at least two prongs of the second fork-shaped end that has the inner thread such that a rotation of the adjustment sleeve moves the adjustment axle along the second axis, thereby adjusting the position of the door leaf relative to the door frame along the second axis.

If desired the second adjustment unit further comprises at least one securing element that is adapted for preventing a rotation of the adjustment sleeve.

Furthermore, a method of operating the above-described aircraft door to adjust the position of the door leaf relative to the door frame, comprises rotating at least one adjustment element of the first adjustment unit in a first predetermined rotation direction around the first axis to move the position of the door leaf relative to the door frame along the first axis in a first direction, and rotating the at least one adjustment element of the first adjustment unit in a second predetermined rotation direction that is opposite the first predetermined rotation direction around the first axis to move the position of the door leaf relative to the door frame along the first axis in a second direction that is opposite the first direction.

According to one aspect, the method further comprises rotating the adjustment sleeve of the second adjustment unit in a third predetermined rotation direction around the second axis to move the position of the door leaf relative to the door frame along the second axis in a third direction, and rotating the adjustment sleeve of the second adjustment unit in a fourth predetermined rotation direction that is opposite the third predetermined rotation direction around the second axis to move the position of the door leaf relative to the door frame along the second axis in a fourth direction that is opposite the third direction.

BRIEF DESCRIPTION OF THE DRAWINGS

Preferred embodiments are outlined by way of example in the following description with reference to the attached drawings. In these attached drawings, identical or identically functioning components and elements are labeled with identical reference numbers and characters and are, consequently, only described once in the following description.

DETAILED DESCRIPTION

Exemplary embodiments may be used with any door or hatch that closes a boundary between two environments. In particular, exemplary embodiments may be used with any vehicle having a door or hatch. Preferably, the door or hatch closes an outside boundary of the vehicle, whereby the door or hatch provides access to the interior of the vehicle from the outside of the vehicle. Examples for vehicles may include aircraft such as airplanes, quadcopters, helicopters, and drones, land-based vehicles including cars, buses, trucks, and motorcycles, or vessels such as ships and boats, etc.

Figure 1:
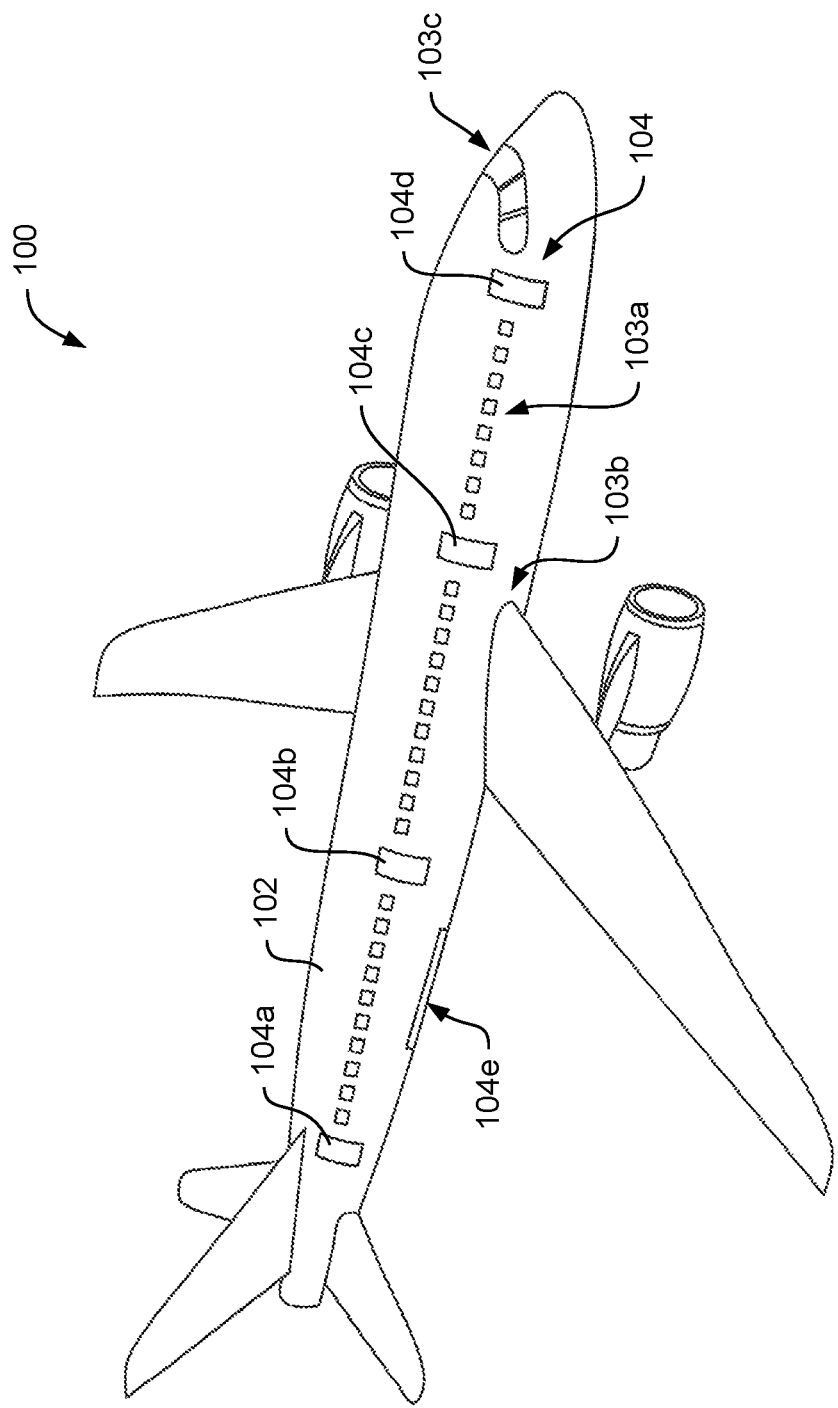
FIG. 1 is a diagram of an illustrative aircraft having several aircraft doors.

FIG. 1 shows an aircraft 100 with an aircraft airframe 102, which is sometimes also referred to as fuselage 102. Illustratively, the aircraft 100 comprises a passenger cabin 103a, a cargo deck 103b, and a flight deck or cockpit 103c. If desired, the aircraft 100 is accessible via a plurality of aircraft doors 104, which exemplarily comprises several cabin access doors 104a, 104b, 104c, and 104d, as well as one or more cargo deck access doors 104e. By way of example, the passenger cabin 103a and the flight deck 103c are accessible via the cabin access doors 104a, 104b, 104c and 104d, and the cargo deck 103b is accessible via the one or more cargo deck access doors 104e.

Illustratively, each aircraft door of the plurality of aircraft doors 104 may be adapted for closing an opening in the fuselage 102 of the aircraft 100 in a closed position, thereby preventing access from outside the aircraft 100, and for providing access to the aircraft 100 through the opening in the fuselage 102 (e.g., to the aircraft passenger cabin 103a, the aircraft cargo deck 103b, and/or the aircraft flight deck 103c) in a fully open position.

If desired, at least one of the plurality of aircraft doors 104 is a swiveling aircraft door that closes the opening in the fuselage 102 in a fluid-tight manner.

At least one aircraft door of the plurality of aircraft doors 104 includes a door frame, a door leaf, a support arm assembly, and first and second connecting elements that connect the support arm assembly with the door leaf and the door frame, respectively.

As shown in FIG. 1, aircraft 100 is embodied by an airplane. However, the present embodiments are not limited to airplanes. Instead, any door that closes a boundary between two environments is likewise contemplated. By way of example, the present door may alternatively be applied to other aircrafts such as helicopters, drones, multicopters, etc., to other vehicles such as ships, spacecrafts, submarines, and so on.

Consequently, the present door is not limited to aircraft doors, but can likewise be applied to any arbitrary door that closes a boundary between two environments. However, for purposes of illustration, the present door is hereinafter described with respect to aircraft doors.

Hereinafter, the x-axis refers to the longitudinal axis of the aircraft 100 that extends through the front and the aft of the aircraft, the y-axis refers to the transversal axis of the aircraft 100 that extends through the starboard side and the port side of the aircraft 100, and the z-axis refers to the vertical axis of the aircraft 100 that extends through the bottom and the top of the aircraft 100.

Figure 2:
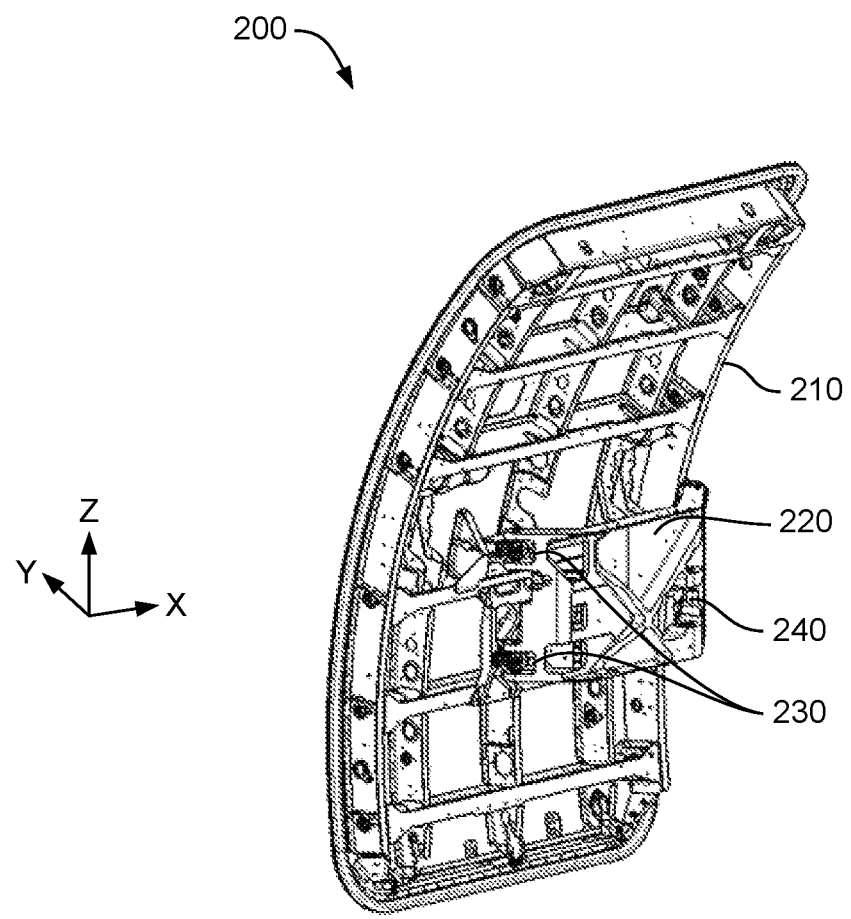
FIG. 2 is a diagram of an illustrative aircraft door with adjustment units that are adapted for adjusting the position of the door leaf relative to the door frame.

FIG. 2 is a diagram of an illustrative aircraft door 200 with adjustment units 230, 240 that are adapted for adjusting the position of the door leaf 210 relative to the door frame.

Illustratively, the aircraft door 200 has a door leaf 210 with stiffening structures. The stiffening structures may be beam-like or truss-like. If desired, the stiffening structures may have an I-shaped, H-shaped, U-shaped, or T-shaped cross section, any combination thereof, or any other shape that is suitable to reinforce the door leaf 210.

As shown in FIG. 2, the aircraft door 200 has a support arm assembly 220 and first and second connecting elements. The first connecting element connects the support arm assembly 220 with the stiffening structures of the door leaf 210 and the second connecting element connects the support arm assembly 220 with the door frame.

As an example, the support arm assembly 220 may have a first fork-shaped end, and the first connecting element may connect the first fork-shaped end of the support arm assembly 220 with the stiffening structures.

As another example, the support arm assembly 220 may have a second fork-shaped end, and the second connecting element may connect the second fork-shaped end of the support arm assembly 220 with a door frame bracket of the door frame.

The first connecting element includes a first adjustment unit that is adapted for adjusting the position of the door leaf 210 relative to the door frame along a first axis (e.g., the x-axis). The first adjustment unit may be arranged in the center of the door leaf and is described in more detail with reference to FIG. 3, FIG. 4, and FIG. 5.

The second connecting element includes a second adjustment unit that is adapted for adjusting the position of the door leaf 210 relative to the door frame along a second axis (e.g., the z-axis). The second adjustment unit is described in more detail below with reference to FIG. 6 and FIG. 7.

Figure 3:
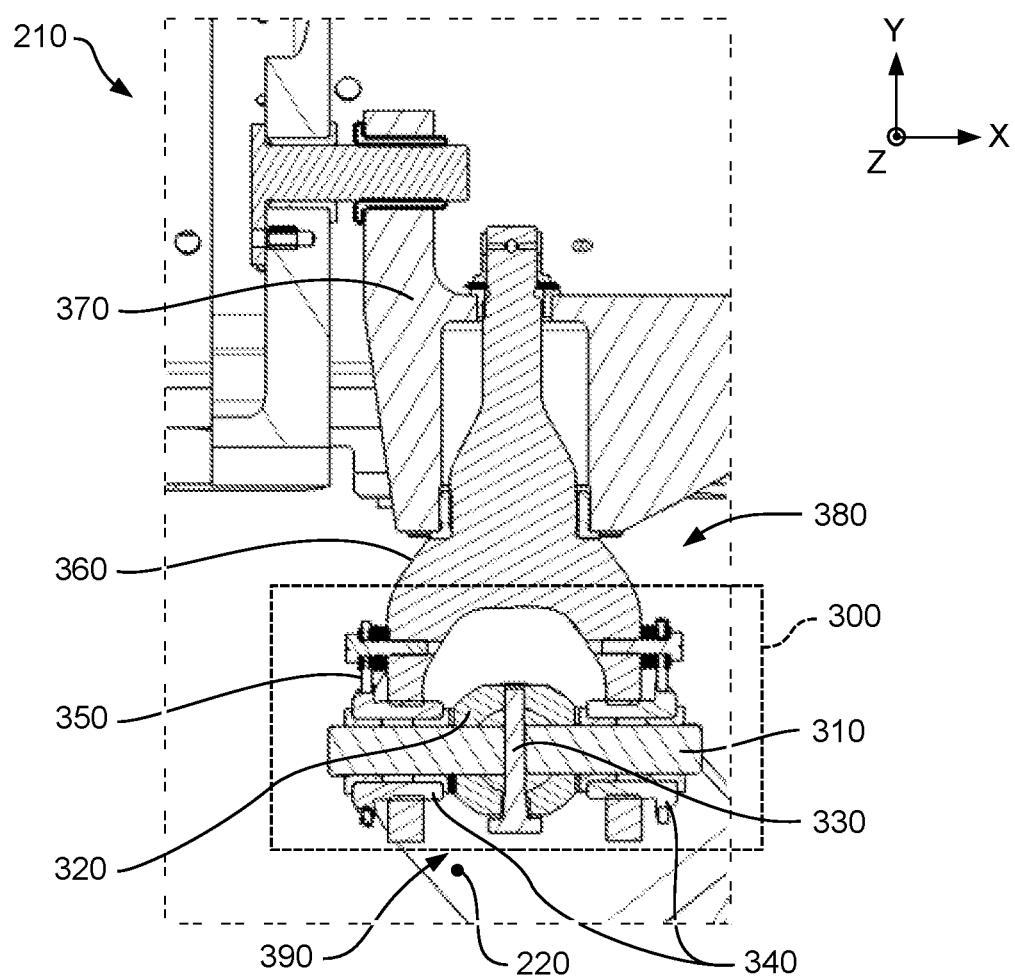
FIG. 3 is a diagram showing an illustrative adjustment unit that is adapted for adjusting the position of the door leaf relative to the door frame along a first axis from a first perspective.

FIG. 3 is a diagram of an illustrative first adjustment unit 300 that is adapted for adjusting the position of the door leaf relative to the door frame along a first axis (i.e., the x-axis) seen from a first perspective. For example, the first perspective may be from above the aircraft door (i.e., in negative z-direction).

Illustratively, the first adjustment unit 300 is adapted for enabling a continuous adjustment of the position of the door leaf 210 relative to the door frame. For example, the adjustment unit 300 may enable a stepless adjustment of the position of the door leaf 210 relative to the door frame.

As shown in FIG. 3, the door leaf 210 may have stiffening structures 370, and the support arm assembly 220 may have a first fork-shaped end 390.

Illustratively, the aircraft door may include a first connecting element 380 that connects the first fork-shaped end 390 of the support arm assembly 220 with the stiffening structures 370 of the door leaf 210.

In some implementations, the first connecting element 380 may include a central element 320. The central element 320 may extend parallel to the second axis (i.e., along the z-axis) between at least two prongs of the first fork-shaped end 390 of the support arm assembly 220. Illustratively, the central element 320 is rotatably attached to the at least two prongs of the first fork-shaped end 390 of the support arm assembly 220.

Figure 4:
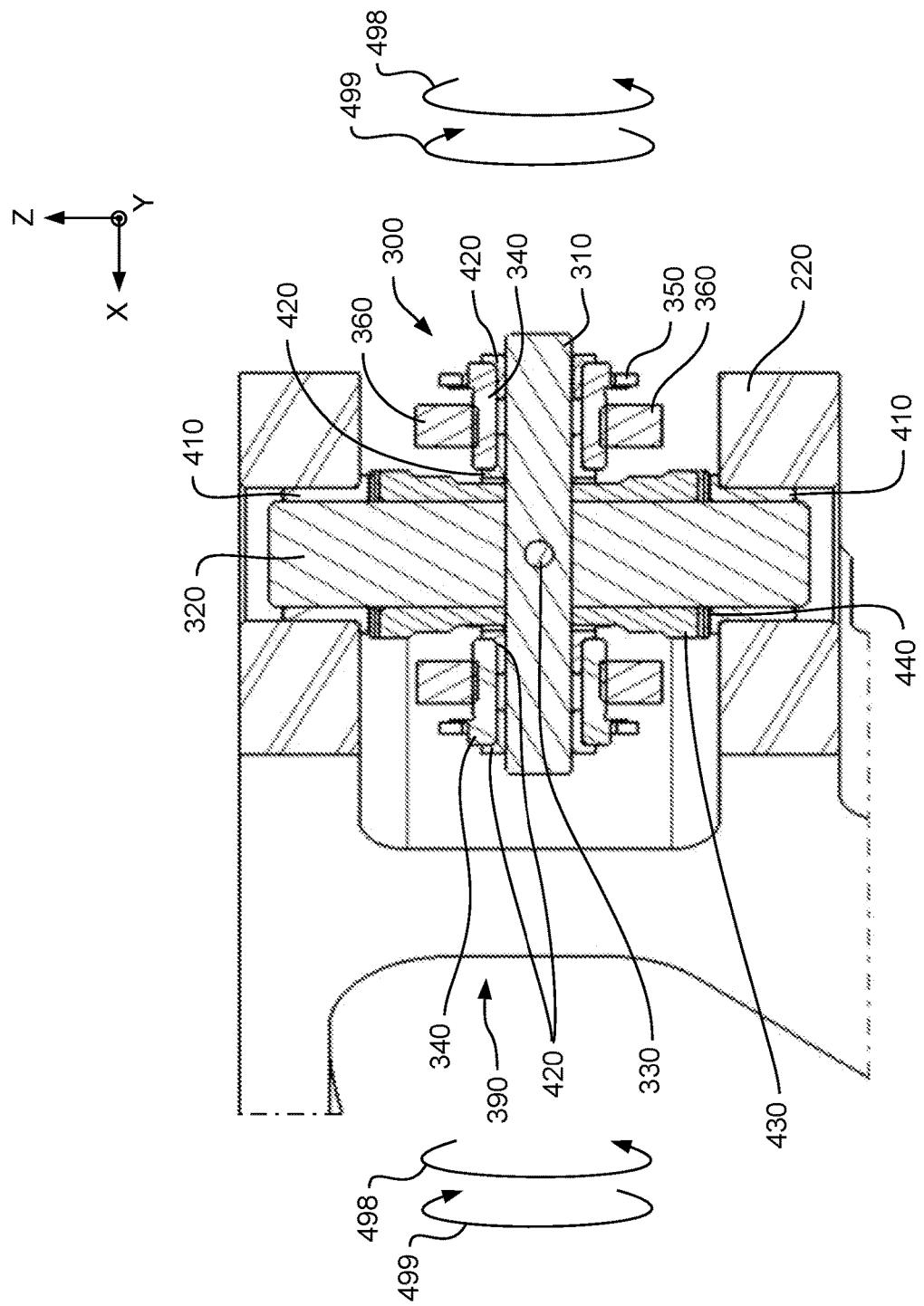
FIG. 4 is a diagram showing the illustrative adjustment unit of FIG. 3 from a second perspective that is perpendicular to the first perspective.
Figure 5:
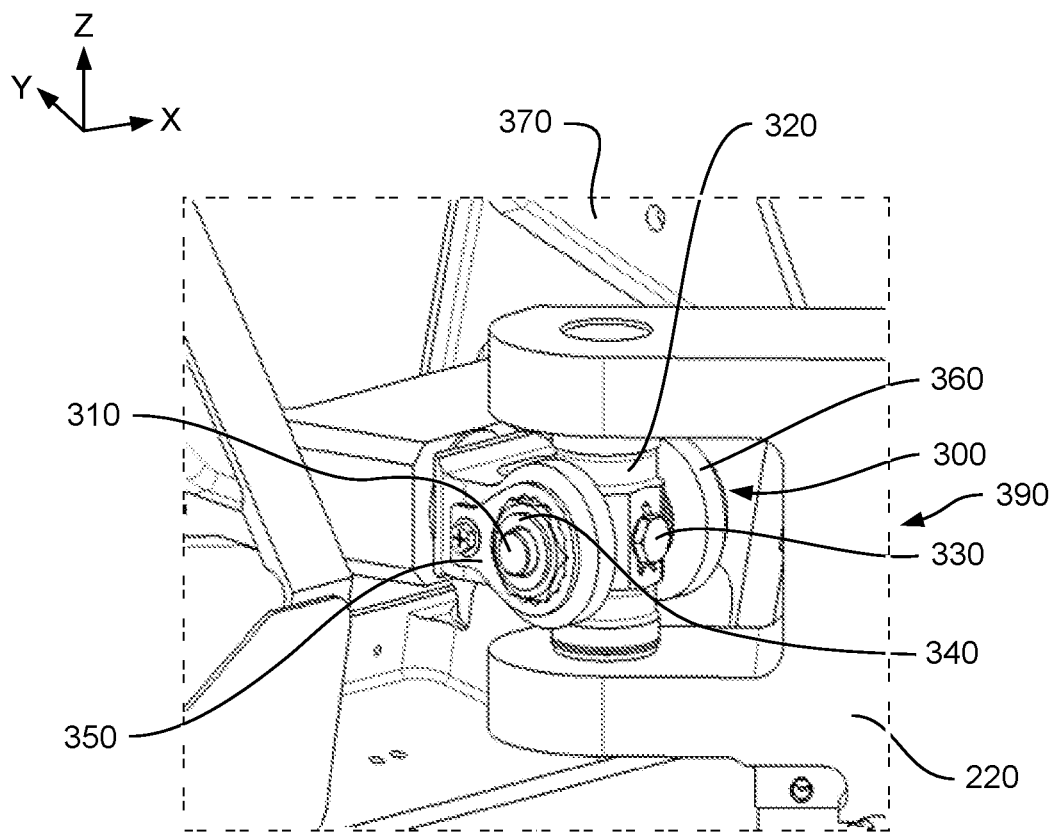
FIG. 5 is a three-dimensional diagram of the illustrative adjustment unit of FIG. 3 and FIG. 4.

Illustratively, the first connecting element 380 may include an inner element 360 that is attached to the stiffening structures 370. If desired, the inner element 360 may be a fork-shaped inner element 360. The fork-shaped inner element 360 may have at least two prongs. For example, the fork-shaped inner element 360 may have three, four, five, six, or more prongs. As shown in FIG. 3 to FIG. 5, the fork-shaped inner element 360 may have two prongs.

In some implementations, the first adjustment unit 300 of the first connecting element 380 may include an adjustment axle 310. The adjustment axle 310 may extend parallel to the first axis (i.e., along the x-axis) through at least two prongs of the at least two prongs of the fork-shaped inner element 360. The at least two prongs of the at least two prongs of the fork-shaped inner element 360, through which the adjustment axle 310 extends, may have inner threads.

Illustratively, the first adjustment unit 300 may include a fixation element 330. As shown in FIG. 3, the fixation element 330 may rigidly attach the adjustment axle 310 to the central element 320. For example, the fixation element 330 may be a pin, a bolt, or a rivet that rigidly attaches the adjustment axle 310 to the central element 320.

By way of example, the first adjustment unit 300 may include at least one adjustment element 340. As shown in FIG. 3, the first adjustment unit 300 includes two adjustment elements 340 that are rotatably mounted to the adjustment axle 310 at two opposite sides of the central element 320.

Illustratively, the at least one adjustment element 340 has an outer thread. For example, each one of the at least one adjustment element 340 may be a threaded sleeve. The outer thread of the at least one adjustment element 340 is adapted for engaging with a corresponding at least one of the inner threads of the fork-shaped inner element 360. Thus, a rotation of the at least one adjustment element 340 may move the fork-shaped inner element 360 relative to the adjustment axle 310 along the first axis (i.e., the x-axis), thereby adjusting the position of the door leaf 210 relative to the door frame along the first axis (i.e., the x-axis).

The at least one adjustment element 340 may be rotated as long as a contact surface (e.g., a bush flange or a lining coating) of the at least one adjustment element 340 is in contact with the central element 320. During adjustment of the door leaf's position along the first axis (i.e., the x-axis), the at least one adjustment element 340 may be counter-rotated on the adjustment axle 310 to move the door leaf 210 relative to the support arm assembly 220.

In some implementations, the first adjustment unit 300 may include at least one securing element 350. The at least one securing element may be adapted for preventing a rotation of the at least one adjustment element 340.

For example, when the final position of the door leaf 210 relative to the door frame along the first axis (i.e., the x-axis) is found, the securing element 350 may secure the at least one adjustment element 340 against rotation. If desired, the securing element 350 may hold the head of the at least one adjustment element 340. For example, the at least one adjustment element 340 may have a hexagonal head, a polygonal head, a drilling hole for wire securing or other means that the securing element 350 may use for preventing a rotation of the at least one adjustment element 340. The securing element 350 may include a clamp or a wire, if desired.

FIG. 4 is a diagram showing the illustrative first adjustment unit 300 of FIG. 3 from a second perspective that is perpendicular to the first perspective. For example, the second perspective may be from the port side to the starboard side of the airplane (i.e., in negative y-direction).

Illustratively, the central element 320 is rotatably attached to the at least two prongs of the first fork-shaped end 390 of the support arm assembly 220, the fixation element 330 rigidly attaches the adjustment axle 310 to the central element 320, and the adjustment axle 310 is attached to the fork-shaped inner element 360 via the at least one adjustment element 340. Thus, the door leaf is rotatable around the z-axis relative to the support arm assembly 220 through a rotation of the central element 320 relative to the first fork-shaped end 390 of the support arm assembly 220. If desired, sockets 410, washers 440, and sleeve 430 may facilitate the rotation of the central element 320 relative to the at least two prongs of the first fork-shaped end 390 of the support arm assembly 220.

In some implementations, the first adjustment unit 300 may include at least one socket 420. The at least one socket 420 may be rotatably attached to the adjustment axle 310.

Illustratively, the fork-shaped inner element 360 has inner threads and the first adjustment unit 300 includes at least one adjustment element 340. The at least one adjustment unit 300 may be rigidly attached with the at least one socket 420. If desired, the first adjustment unit 300 may have as many adjustment elements and sockets as the fork-shaped inner element 360 has prongs. As shown in FIG. 4, the fork-shaped inner element 360 has two prongs, the first adjustment unit 300 has two adjustment elements 340 with two sockets 420 each, and the two sockets 420 and associated adjustment elements 340 are arranged on the adjustment axle 310 at opposite sides of the central element 320 in direction of the x-axis.

The at least one adjustment element 340 may have an outer thread that is adapted for engaging with at least one of the inner threads of the fork-shaped inner element 360 such that a rotation of the at least one adjustment element 340 moves the fork-shaped inner element 360 relative to the adjustment axle 310 along the first axis (i.e., the x-axis), thereby adjusting the position of the door leaf relative to the door frame along the first axis (i.e., the x-axis).

In the final position of the door leaf relative to the door frame along the first axis (i.e., the x-axis), the at least one adjustment element 340 has two adjustment elements 340 that clamp the central element 320 from two sides.

If desired, the first adjustment unit 300 may include at least one securing element 350. The at least one securing element 350 may be adapted for preventing a rotation of the at least one adjustment element 340. For example, when the final position of the door leaf relative to the door frame along the first axis (i.e., the x-axis) is found, the securing element 350 may secure the at least one adjustment element 340 against rotation.

If desired, at least one securing element 350 may secure each adjustment element 340 of the at least one adjustment element 340 against rotation. As shown in FIG. 4, the adjustment unit 300 includes two adjustment elements 340 and two securing elements 350, one for each adjustment element 340.

If desired, the securing element 350 may hold the head of the at least one adjustment element 340. For example, the at least one adjustment element 340 may have a hexagonal head, a polygonal head, a drilling hole for wire securing or other means that the securing element 350 may use for preventing a rotation of the at least one adjustment element 340. The securing element 350 may include a tab washer, a key washer, a notch washer, a cotter pin (e.g., if the at least one adjustment element 340 has a crown nut), a clamp, or a wire, if desired.

FIG. 5 is a three-dimensional diagram of the illustrative adjustment unit 300 of FIG. 3 and FIG. 4. FIG. 5 further illustrates the arrangement of the central element 320, the adjustment axle 310, the fixation element 330, the adjustment element 340, the fork-shaped inner element 360, and the securing element 350.

As shown in FIG. 5, the securing element 350 is a nut guard that has a polygonal inside and a protrusion with a hole. The polygonal inside fits over the adjustment element 340 such that the nut guard can be installed non-rotatably over the adjustment element 340. A screw through the hole in the protrusion can attach the nut guard to the fork-shaped inner element 360 such that the adjustment element 340 is prevented from rotating relative to the adjustment axle 310.

Figure 6:
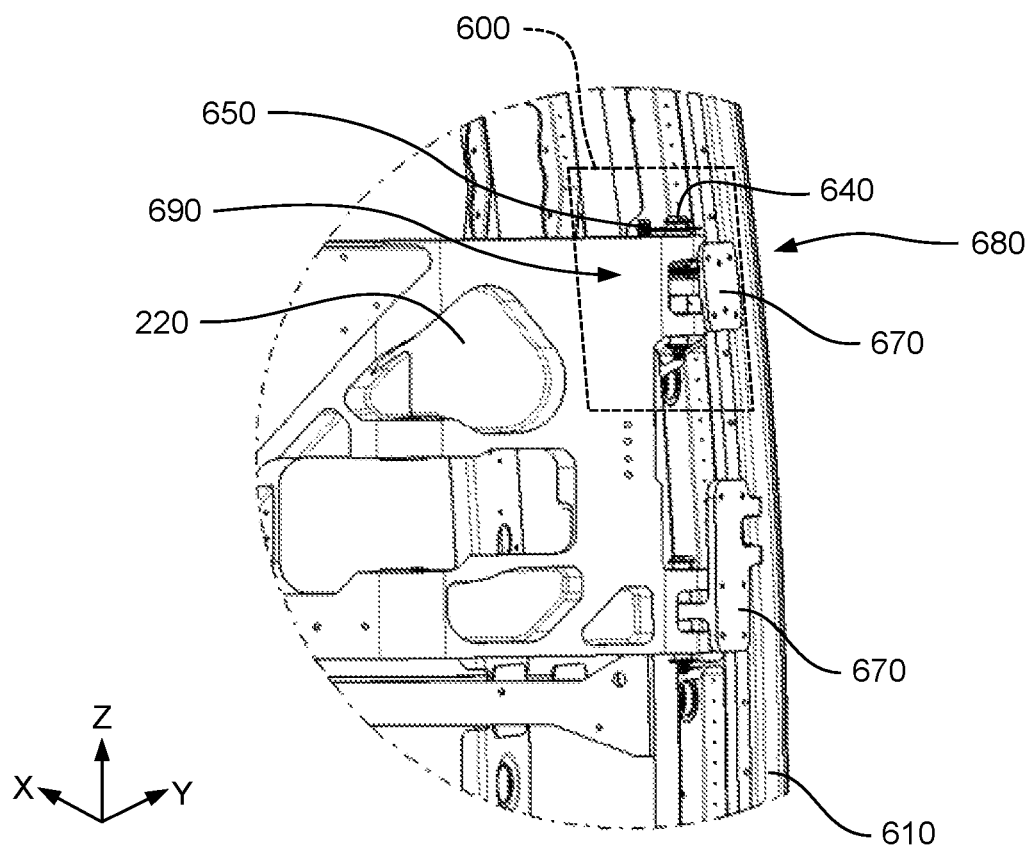
FIG. 6 is a three-dimensional diagram of an illustrative adjustment unit that is adapted for adjusting the position of the door leaf relative to the door frame along a second axis.

FIG. 6 is a three-dimensional diagram of an illustrative adjustment unit 600 that is adapted for adjusting the position of a door leaf relative to a door frame 610 along a second axis (i.e., the z-axis) that is perpendicular to the first axis (i.e., the x-axis).

Illustratively, the second adjustment unit 600 is adapted for enabling a continuous adjustment of the position of the door leaf relative to the door frame 610. For example, the adjustment unit 600 may enable a stepless adjustment of the position of the door leaf relative to the door frame 610.

As shown in FIG. 6, the door frame 610 may have a door frame bracket 670, and the support arm assembly 220 may have a second fork-shaped end 690 that is different than the first fork-shaped end 390 of FIG. 3. The second fork-shaped end 690 may have at least two prongs. If desired, the second fork-shaped end 690 may have more than two prongs. For example, the second fork-shaped end 690 may have three, four, five, six, or more prongs.

Illustratively, the support arm assembly 220 may have a third fork-shaped end that engages with another door frame bracket 670 of the door frame. The additional connection of the third fork-shaped end with the other door frame bracket 670 may be rotatable and axially displaceable by means of two bushings in the support arm assembly 220 and a clamping sleeve. Thus, the additional connection simply follows the movement of the adjustment along the second axis (i.e., the z-axis) that occurs as a result of operating the second adjustment unit 600.

Illustratively, the aircraft door may include a second connecting element 680 that connects the second fork-shaped end 690 of the support arm assembly 220 with the door frame bracket 670 of the door frame 610.

By way of example, the second adjustment unit 600 may include an adjustment element 640. If desired, the second adjustment unit 600 may include a securing element 650. The securing element 650 may be adapted for preventing a rotation of the adjustment element 640.

Figure 7:
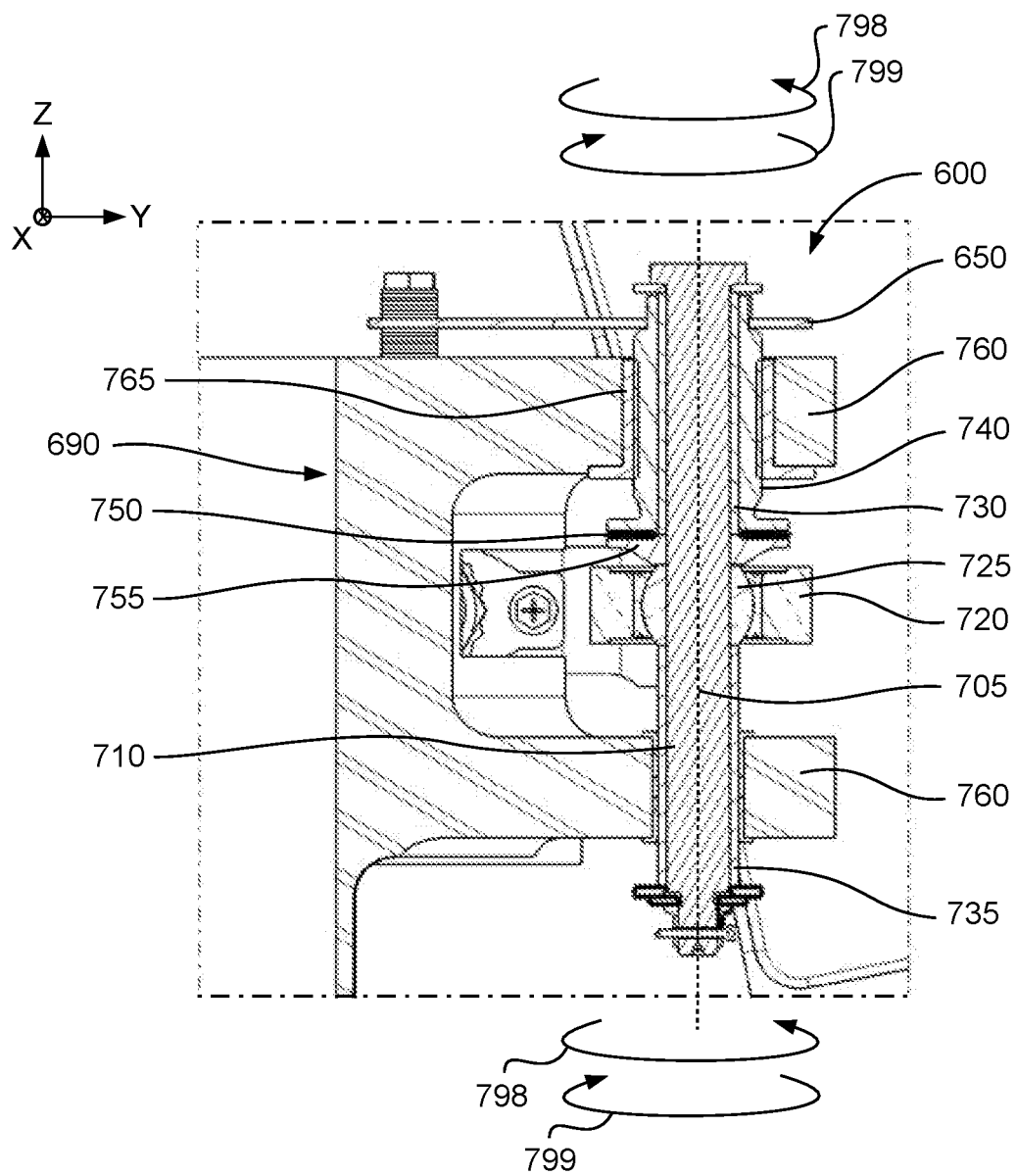
FIG. 7 is a diagram showing a detailed two-dimensional representation of the illustrative adjustment unit of FIG. 6.

FIG. 7 is a diagram showing a detailed two-dimensional representation of the illustrative adjustment unit 600 of FIG. 6.

Illustratively, the second adjustment unit 600 may include a central element 720. The central element 720 may be attached to the door frame bracket (e.g., door frame bracket 670 of FIG. 6). If desired, the central element 720 may extend along the x-axis.

By way of example, the second adjustment unit 600 may include an adjustment axle 710. The adjustment axle 710 may extend parallel to the second axis (i.e., the z-axis) along the adjustment axis 705 through at least two prongs 760 of the second fork-shaped end 690 of the support arm assembly 220. As shown in FIG. 7, the second fork-shaped end 690 has two prongs 760, and the adjustment axle 710 extends along the adjustment axis 705 through the two prongs 760 of the support arm assembly 220.

Illustratively, the second adjustment unit 600 may include first and second clamping sleeves 730, 735. The first and second clamping sleeves 730, 735 may attach the adjustment axle 710 to the central element 720. In some implementations, the first and second clamping sleeves 730, 735 prevent a movement of the adjustment axle 710 relative to the central element 720 along the second axis (i.e., the z-axis) and thereby a movement of the adjustment axle 710 relative to the door frame bracket along the second axis (i.e., the z-axis).

If desired, a spherical bearing 725 may be arranged inside the central element 720. The spherical bearing 725 may enable a rotation of the central element 720 about the adjustment axis 705.

Illustratively, at least one of the at least two prongs 760 of the second fork-shaped end 690 of the support arm assembly may have an inner thread. For example, a threaded bushing 765 may be located at one of the at least two prongs 760 to provide the inner thread. As shown in FIG. 7, the upper prong 760 (i.e., the prong which is further away from the origin on the z-axis) may have an inner thread while the lower prong 760 is missing an inner thread.

By way of example, the second adjustment unit 600 includes an adjustment sleeve 740. The adjustment sleeve 740 may be rotatably mounted to one of the first and second clamping sleeves 730, 735 to prevent a movement of the adjustment sleeve 740 relative to the adjustment axle 710 along the second axis (i.e., the z-axis). As shown in FIG. 7, the adjustment sleeve 740 is mounted to the first clamping sleeve 730.

The adjustment sleeve 740 may have an outer thread. The outer thread may be adapted for engaging with the at least one of the at least two prongs 760 of the second fork-shaped end 690 that has the inner thread or the threaded bushing 765. Thus, a rotation of the adjustment sleeve 740 moves the adjustment axle 710 along the second axis (i.e., the z-axis), thereby adjusting the position of the door leaf relative to the door frame along the second axis (z-axis).

In some implementations, a trapezoidal thread may be selected between the threaded bushing 765 and the adjustment sleeve 740.

The adjustment sleeve 740 may be supported by means of a carrying ring 755 and a gliding element 750 that separate the clamp sleeve 730 from the central element 720, respectively the door frame bracket and facilitate the rotational movement of the central element 720 relative to the door frame bracket about the adjustment axis 705.

Consider the scenario in which the adjustment sleeve 740 is rotated on the adjustment axle 710. In this scenario, the outer thread of the adjustment sleeve 740 engages with the inner thread of the prong 760 of the second fork-shaped end 690 or the threaded bushing 765 and moves the support arm assembly and thereby the door leaf along the second axis (i.e., the z-axis) either upward or downward relative to the door frame.

Illustratively, the second adjustment unit 600 includes at least one securing element 650. The at least one securing element 650 is adapted for preventing a rotation of the adjustment sleeve 740.

Thus, when the final position of the door leaf relative to the door frame along the second axis (i.e., the z-axis) is found, the securing element 650 may secure the adjustment sleeve 740 against rotation.

If desired, the securing element 650 may hold the head of the adjustment sleeve 740. For example, the adjustment sleeve 740 may have a hexagonal head, a polygonal head, a drilling hole for wire securing or other means that the securing element 650 may use for preventing a rotation of the adjustment sleeve 740. The securing element 650 may include a tab washer, a key washer, a notch washer, a cotter pin (e.g., if the adjustment sleeve 740 has a crown nut), a clamp, or a wire, if desired.

Since the securing element 650 secures the adjustment sleeve 740 against rotation, installing the securing element 650 on the adjustment sleeve 740 ensures the maintenance of the position of the door leaf relative to the door frame along the second axis (i.e., the z-axis).

Figure 8:
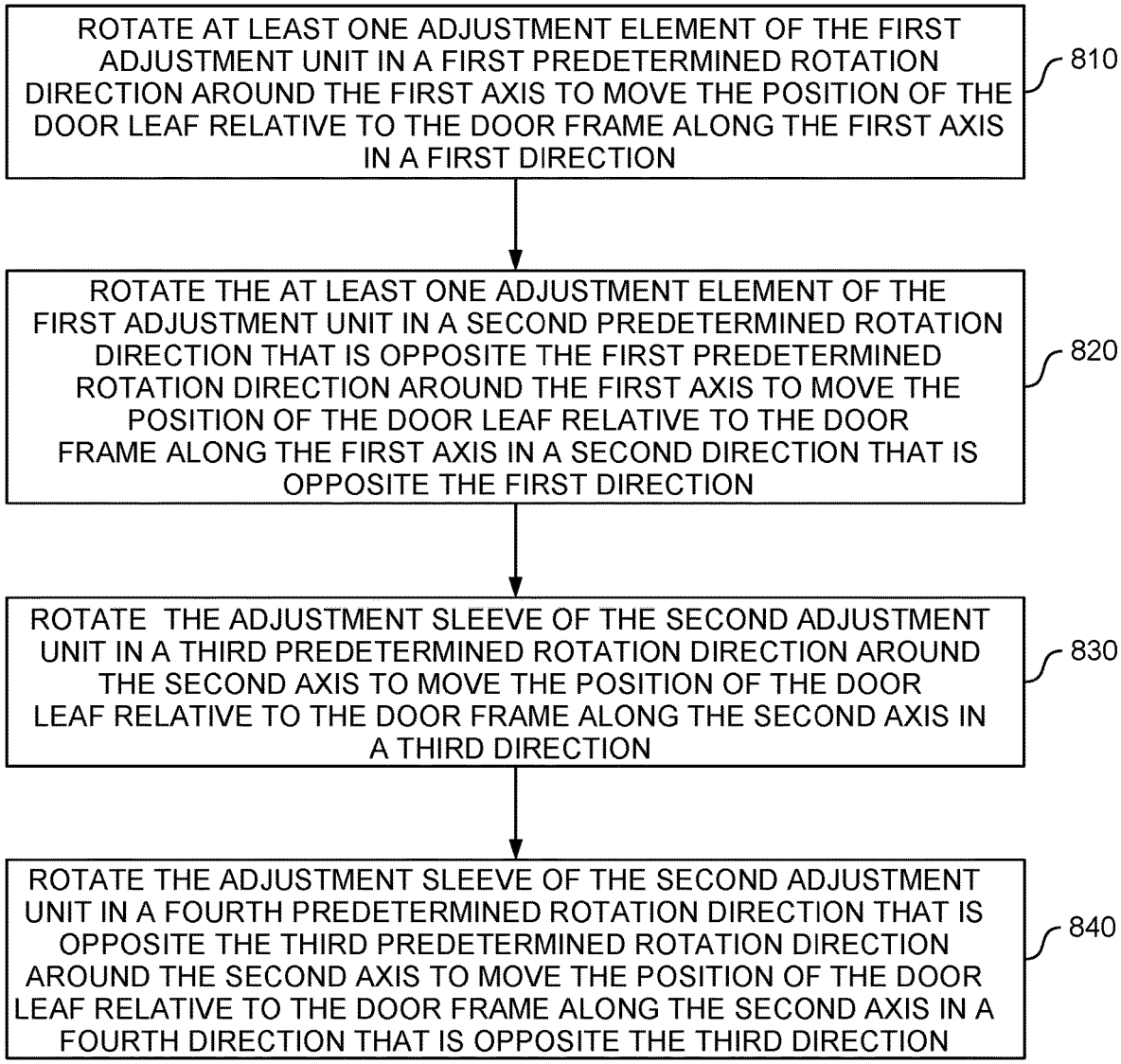
FIG. 8 is a flowchart showing operations for adjusting the position of the door leaf relative to the door frame.

FIG. 8 is a flowchart of a method 800 showing operations that an operator may perform for adjusting the position of a door leaf (e.g., door leaf 210 of FIG. 2) relative to a door frame (e.g., door frame 610 of FIG. 6).

During operation 810, the operator rotates at least one adjustment element of the first adjustment unit in a first predetermined rotation direction around the first axis (x-axis) to move the position of the door leaf relative to the door frame along the first axis (x-axis) in a first direction (i.e., in positive or negative direction along the x-axis).

For example, the operator may rotate the two adjustment elements 340 of the first adjustment unit 300 of FIG. 3, FIG. 4, or FIG. 5 in a first predetermined rotation direction 498 about the adjustment axle 310 (i.e., the x-axis) to move the position of the door leaf 210 relative to the door frame along the first axis (i.e., the x-axis) in a first direction (e.g., in positive direction along the x-axis).

During operation 820, the operator may rotate the at least one adjustment element of the first adjustment unit in a second predetermined rotation direction that is opposite the first predetermined rotation direction around the first axis (x-axis) to move the position of the door leaf relative to the door frame along the first axis (i.e., the x-axis) in a second direction that is opposite the first direction (i.e., in negative or positive direction along the x-axis).

For example, the operator may rotate the two adjustment elements 340 of the first adjustment unit 300 of FIG. 3, FIG. 4, or FIG. 5 in a second predetermined rotation direction 499 that is opposite the first predetermined rotation direction 498 about the adjustment axle 310 (i.e., the x-axis) to move the position of the door leaf 210 relative to the door frame along the first axis (i.e., the x-axis) in a second direction that is opposite the first direction. (e.g., in negative direction along the x-axis).

If desired, during operation 830, the operator may rotate the adjustment sleeve of the second adjustment unit in a third predetermined rotation direction around the second axis (z-axis) to move the position of the door leaf relative to the door frame along the second axis (i.e., the z-axis) in a third direction (i.e., in positive or negative direction along the z-axis).

For example, the operator may rotate the adjustment sleeve 740 of the second adjustment unit 600 of FIG. 7 in a third predetermined rotation direction 798 about the adjustment axis 705 (i.e., the z-axis) to move the position of the door leaf relative to the door frame along the second axis (i.e., the z-axis) in a third direction (e.g., in positive direction along the z-axis).

In some implementations, during operation 840, the operator may rotate the adjustment sleeve of the second adjustment unit in a fourth predetermined rotation direction that is opposite the third predetermined rotation direction around the second axis (z-axis) to move the position of the door leaf relative to the door frame along the second axis (i.e., the z-axis) in a fourth direction that is opposite the third direction (i.e., in negative or positive direction along the z-axis).

For example, the operator may rotate the adjustment sleeve 740 of the second adjustment unit 600 of FIG. 7 in a fourth predetermined rotation direction 799 that is opposite the third predetermined rotation direction 798 about the adjustment axis 705 (i.e., the z-axis) to move the position of the door leaf relative to the door frame along the second axis (i.e., the z-axis) in a fourth direction that is opposite the third direction (e.g., in negative direction along the z-axis).

It should be noted that modifications to the above described embodiments are within the common knowledge of the person skilled in the art and, thus, also considered as being part of the present invention.

For example, the lower prong 760 of FIG. 7 (i.e., the prong which is closer to the origin on the z-axis) may have an inner thread while the upper prong 760 is missing an inner thread, and the adjustment sleeve 740 of the second adjustment unit 600 may be mounted to the second clamping sleeve 735.

Moreover, the second fork-shaped end 690 of the support arm assembly 220 may have more than two prongs 760 and the adjustment axle 710 may extend through all pongs of the second fork-shaped end.

REFERENCE LIST

100 aircraft
102 aircraft airframe, fuselage
103*a* aircraft passenger cabin
103*b* aircraft cargo deck
103*c* aircraft flight deck
104 aircraft door
104*a*, 104*b*, 104*c*, 104*d* cabin access doors
104*e* cargo deck access door
200 aircraft door
210 door leaf
220 support arm assembly
230 adjustment unit
240 adjustment unit 300 adjustment unit
310 adjustment axle
320 central element
330 fixation element
340 adjustment element
350 securing element
360 inner element
370 stiffening structures
380 connecting element
390 fork-shaped end
410 socket
420 socket
430 sleeve
440 washers
498, 499 rotation direction
600 adjustment unit
610 door frame
640 adjustment element
650 securing element
670 door frame bracket
680 connecting element
690 fork-shaped end
705 adjustment axis
710 adjustment axle
720 central element
725 spherical bearing
730 clamping sleeve
735 clamping sleeve
740 adjustment sleeve with outer thread
750 gliding element
755 carrying ring
760 prongs
765 threaded bushing
798, 799 rotation direction
800 method
810, 820, 830, 840 operations

What is claimed is:

1. An aircraft door for closing an opening in a fuselage of an aircraft in a closed position and for providing access to the aircraft through the opening in the fuselage in a fully open position, comprising:
a door frame with a door frame bracket;
a door leaf with stiffening structures;
a support arm assembly, comprising:
a first fork-shaped end, and
a second fork-shaped end;
a first connecting element that connects the first fork-shaped end of the support arm assembly with the stiffening structures and comprises:
a first adjustment unit that is adapted for adjusting the position of the door leaf relative to the door frame along a first axis (x); and
a second connecting element that connects the second fork-shaped end of the support arm assembly with the door frame bracket and comprises:
a second adjustment unit that is adapted for adjusting the position of the door leaf relative to the door frame along a second axis (z) that is perpendicular to the first axis (x).

2. The aircraft door of claim 1, wherein at least one of the first adjustment unit or the second adjustment unit is adapted for enabling a continuous adjustment of the position of the door leaf relative to the door frame along the first axis (x) or the second axis (z).

3. The aircraft door of claim 1, wherein the first connecting element further comprises:
a central element that extends parallel to the second axis (z) between at least two prongs of the first fork-shaped end of the support arm assembly, wherein the central element is rotatably attached to the at least two prongs of the first fork-shaped end of the support arm assembly.

4. The aircraft door of claim 3, wherein the first connecting element further comprises:
a fork-shaped inner element that is attached to the stiffening structures.

5. The aircraft door of claim 4, wherein the first adjustment unit further comprises:
an adjustment axle that extends parallel to the first axis (x) through at least two prongs of the fork-shaped inner element; and
a fixation element that rigidly attaches the adjustment axle to the central element.

6. The aircraft door of claim 5, wherein the first adjustment unit further comprises:
at least one socket that is rotatably attached to the adjustment axle.

7. The aircraft door of claim 6, wherein the fork-shaped inner element has inner threads and the first adjustment unit further comprises:
at least one adjustment element that is rigidly attached with the at least one socket, wherein the at least one adjustment element has an outer thread that is adapted for engaging with at least one of the inner threads of the fork-shaped inner element such that a rotation of the at least one adjustment element moves the fork-shaped inner element relative to the adjustment axle along the first axis (x), thereby adjusting the position of the door leaf relative to the door frame along the first axis (x).

8. The aircraft door of claim 7, wherein the first adjustment unit further comprises:
at least one securing element that is adapted for preventing a rotation of the at least one adjustment element.

9. The aircraft door of claim 1, wherein the first adjustment unit is arranged in the center of the door leaf.

10. The aircraft door of claim 1, wherein the second adjustment unit further comprises:
a central element that is attached to the door frame bracket.

11. The aircraft door of claim 10, wherein the second adjustment unit further comprises:
an adjustment axle that extends parallel to the second axis (z) through at least two prongs of the second fork-shaped end of the support arm assembly; and
first and second clamping sleeves that attach the adjustment axle to the central element and prevent a movement of the adjustment axle relative to the central element along the second axis (z).

12. The aircraft door of claim 11, wherein at least one of the at least two prongs of the second fork-shaped end has an inner thread and the second adjustment unit further comprises:
an adjustment sleeve with an outer thread that is rotatably mounted to one of the first and second clamping sleeves to prevent a movement of the adjustment sleeve relative to the adjustment axle along the second axis (z), wherein the outer thread is adapted for engaging with the at least one of the at least two prongs of the second fork-shaped end that has the inner thread such that a rotation of the adjustment sleeve moves the adjustment axle along the second axis (z), thereby adjusting the position of the door leaf relative to the door frame along the second axis (z).

13. The aircraft door of claim 12, wherein the second adjustment unit further comprises:
at least one securing element that is adapted for preventing a rotation of the adjustment sleeve.

14. A method of operating the aircraft door of claim 1 to adjust the position of the door leaf relative to the door frame, comprising:
rotating at least one adjustment element of the first adjustment unit in a first predetermined rotation direction around the first axis (x) to move the position of the door leaf relative to the door frame along the first axis (x) in a first direction; and
rotating the at least one adjustment element of the first adjustment unit in a second predetermined rotation direction that is opposite the first predetermined rotation direction around the first axis (x) to move the position of the door leaf relative to the door frame along the first axis (x) in a second direction that is opposite the first direction.

15. The method of claim 14, further comprising:
rotating the adjustment sleeve of the second adjustment unit in a third predetermined rotation direction around the second axis (z) to move the position of the door leaf relative to the door frame along the second axis (z) in a third direction; and
rotating the adjustment sleeve of the second adjustment unit in a fourth predetermined rotation direction that is opposite the third predetermined rotation direction around the second axis (z) to move the position of the door leaf relative to the door frame along the second axis (z) in a fourth direction that is opposite the third direction.

16. An aircraft door for closing an opening in a fuselage of an aircraft in a closed position and for providing access to the aircraft through the opening in the fuselage in a fully open position, comprising:
a door frame with a door frame bracket;
a door leaf with stiffening structures;
a support arm assembly, comprising:
a first fork-shaped end, and
a second fork-shaped end;
a first connecting element that connects the first fork-shaped end of the support arm assembly with the stiffening structures and comprises:
a first adjustment unit that is adapted for adjusting the position of the door leaf relative to the door frame along a first axis (x); and
a second connecting element that connects the second fork-shaped end of the support arm assembly with the door frame bracket and comprises:
a second adjustment unit that is adapted for adjusting the position of the door leaf relative to the door frame along a second axis (z) that is perpendicular to the first axis (x);
wherein the first adjustment unit further comprises:
at least one socket rotatably attached to the adjustment axle;
wherein the first adjustment unit further comprises:
at least one adjustment element rigidly attached with the at least one socket, wherein the at least one adjustment element is adapted for engaging with the first connecting element such that a rotation of the at least one adjustment element moves the first connecting element relative to the adjustment axle along the first axis (x), thereby adjusting the position of the door leaf relative to the door frame along the first axis (x).

17. The aircraft door of claim 16, wherein at least one of the first adjustment unit or the second adjustment unit is adapted for enabling a continuous adjustment of the position of the door leaf relative to the door frame along the first axis (x) or the second axis (z).

18. The aircraft door of claim 16, wherein the first connecting element further comprises:
a central element that extends parallel to the second axis (z) between at least two prongs of the first fork-shaped end of the support arm assembly, wherein the central element is rotatably attached to the at least two prongs of the first fork-shaped end of the support arm assembly.

* * * * *